US010678499B1

(12) United States Patent
Martay et al.

(10) Patent No.: US 10,678,499 B1
(45) Date of Patent: Jun. 9, 2020

(54) AUDIO INTERFACE DEVICE AND AUDIO INTERFACE SYSTEM

(71) Applicant: i2x GmbH, Berlin (DE)

(72) Inventors: Claudio Martay, Berlin (DE); Michael Brehm, Berlin (DE); Evgenii Khamukhin, Berlin (DE)

(73) Assignee: i2x GmbH, Berlin (DE)

( * ) Notice: Subject to any disclaimer, the term of this patent is extended or adjusted under 35 U.S.C. 154(b) by 0 days.

(21) Appl. No.: 16/262,095

(22) Filed: Jan. 30, 2019

(30) Foreign Application Priority Data

Nov. 29, 2018 (EP) ..................................... 18209159

(51) Int. Cl.
*G06F 3/16* (2006.01)
*H04R 3/00* (2006.01)

(52) U.S. Cl.
CPC ............... *G06F 3/165* (2013.01); *H04R 3/00* (2013.01); *H04R 2420/07* (2013.01)

(58) Field of Classification Search
CPC ........ G06F 3/165; H04R 3/00; H04R 2420/07
See application file for complete search history.

(56) References Cited

U.S. PATENT DOCUMENTS

| 2002/0065651 | A1* | 5/2002 | Kellner | G06F 17/28 |
| | | | | 704/231 |
| 2009/0023479 | A1 | 1/2009 | Hulvey | |
| 2010/0158288 | A1 | 6/2010 | Winter | |
| 2012/0059496 | A1 | 3/2012 | Gong et al. | |
| 2018/0097922 | A1 | 4/2018 | Pedersen | |
| 2019/0079783 | A1* | 3/2019 | Hardi | G06F 9/451 |

FOREIGN PATENT DOCUMENTS

WO   WO-2018/156103 A1   8/2018

OTHER PUBLICATIONS

Extended European Search Report for EP Patent Application No. 18209159.5, dated May 15, 2019.

* cited by examiner

*Primary Examiner* — Andrew L Sniezek
(74) *Attorney, Agent, or Firm* — Foley & Lardner LLP

(57) ABSTRACT

An audio interface device, comprising: an interface unit and a wireless unit, wherein the interface unit is configured to relay a first audio signal transmitted between a microphone and a communication device and a second audio signal transmitted between the communication device and a speaker, and to route first audio data related to the first audio signal and second audio data related to the second audio signal to the wireless unit; and wherein the wireless unit is configured to transmit the first audio data and the second audio data to a remote audio device.

17 Claims, 6 Drawing Sheets

AUDIO INTERFACE DEVICE AND AUDIO INTERFACE SYSTEM

CROSS REFERENCE TO RELATED APPLICATION

The present application claims priority to and the benefit of European Patent Application No. 18209159.5, titled "AUDIO INTERFACE DEVICE AND AUDIO INTERFACE SYSTEM," and filed Nov. 29, 2018, the contents of which are hereby incorporated herein by reference in its entirety for all purposes.

TECHNICAL FIELD

The present solution relates to an audio interface device and audio interface system.

BACKGROUND ART

A desktop or workstation computer providing access to a telephone system, e.g. through a voice over IP (VoIP) service provider, may be used to realize voice telephony in, for example, a call-center. In that context, a wireless headset system for use with the VoIP telephone system of a call-center is known from US 2018/097922 A1. Here, a base unit connected to a telephone system, e.g. through the computer, comprises a transceiver configured to communicate wirelessly with the headset. With this configuration, the user or "agent" is freed from having to hand-hold a telephone and may engage in both computer-related tasks, e.g. typing on a keyboard, and call-related tasks, e.g. engaging in the call. In such a scenario, the computer may need to provide the appropriate hardware to process the audio signal received from the wireless headset for noise suppression, filtering or similar, and the wireless headset may need to be of sufficient quality to minimize the influence of noise to begin with.

In this regard, a device and method are known from US 2012/0059496 A1 and US 2012/0303846 A1 implementing voice over USB (VoUSB) where audio data is transmitted from a wireless data terminal, e.g. headset, over a USB interface to a terminal equipment, e.g. a computer, for audio processing and then sent back to the wireless data terminal once processed. Herein, the wireless data terminal may not have sufficient resources to implement an audio codec in order to, for example, filter the audio data. As such, and particularly when noise is superimposed on the audio data, filtering and transmitting the audio data back and forth is particularly favorable since the terminal equipment likely has higher processing capacity for audio processing than the wireless data terminal. Essentially, by using a terminal equipment as a remote computing device, e.g. as a sound card, a reduction of component numbers in the wireless data terminal becomes possible which in turn reduces its complexity, size and cost. Put differently, by use of the USB interface, the wireless data terminal may turn a computer into a "remote sound card" by causing the computer to execute a corresponding program.

SUMMARY

Technical Problem

However, if no appropriate hardware such as an internal sound card is provided in a computer, the computer may not be able to provide services related to a remote sound card. Additionally, even if the appropriate hardware were provided, requiring a corresponding program to interface with the hardware limits the flexibility of the system since the program may be incompatibility with the operating system or system architecture. Further to such software and hardware problems, the prior art uses a terminal equipment merely as a remote sound card and requires the wireless data terminal to engage in and provide telephony services since only the terminal equipment is connected to a corresponding wireless communication network. The wireless data terminal may therefore not be used in an environment where audio data needs to be stored, processed, forwarded and/or analyzed, on a real-time basis, which may be the case in, for example, a call-center.

Additionally, if the terminal equipment were to provide telephony services, such as VoIP, as may be the case in a conventional call-center, and if VoIP call data/information is to be processed for e.g. call analytics and/or processing, audio and/or speech analysis or transcription, the call data has to be gathered by the VoIP service provider and a analysis result is then be sent back to inform about the above processing. The problem with this approach is the abundance of VoIP providers, each with their individual integration obstacles and technical approach to facilitate their VoIP integration into the call-center. It is time consuming, costly and error prone to implement with each VoIP service provider a solution to offer and implement the above mentioned processing technology. When using the terminal equipment itself to perform the above mentioned processing, a further problem arises in that the terminal equipment may have limited or restricted computational capacity and thus is not capable to perform the VoIP call data/information processing in real-time. After all, the personal or workstation computer (i.e. the terminal equipment) may not be able to facilitate both VoIP and speech/audio analysis in a real-time manner and the headset is likely not capable of this processing either.

Solution

The present solution solves the above technical problems with the subject-matter of the independent claims, whilst the dependent claims define further embodiments.

More specifically, according to the present solution, an audio interface device and an audio interface system are defined wherein the audio interface device is configured to relay audio signals between a microphone and a communication device, and route related audio data to towards a remote audio device. In this respect, as an embodiment of the present solution, it provides an operation system independent solution that enables audio data storage, processing, forwarding and/or analysis in the environment of a call-center without working through a VoIP provider or the communication device.

More specifically, this general technical solution allows a call analytics provider or call processing provider to seamlessly interface the defined device into the communication device (e.g. computer) and stream real-time feedback on the call to the client, agent and/or other related personal, without the trouble of integrating the device with a VoIP provider. Additionally, the general technical solution of the present solution means that it can be used in the context of any operating system.

Advantageous Effect of the Present Solution

An advantageous effect of the claimed subject-matter comprises for example the integration of speech recognition and/or to provide analytic feedback on a call whilst avoiding system requirements like specific hardware or operating system. Having an improved method of handling call data has the advantage of requiring fewer dependencies, being a backup and/or alternative solution for handling a duplicate copy of call data or audio data to a server that might be required to, for security or legal reasons, not be sent through typical VoIP service providers.

DETAILED DESCRIPTION OF THE EMBODIMENTS

Embodiments of the present solution are described in the following description with reference to the Figures. It is noted that the following description should not be construed as limiting the present solution. Herein, same or similar reference signs indicate the same or similar components, elements, or operations.

Figure 1:
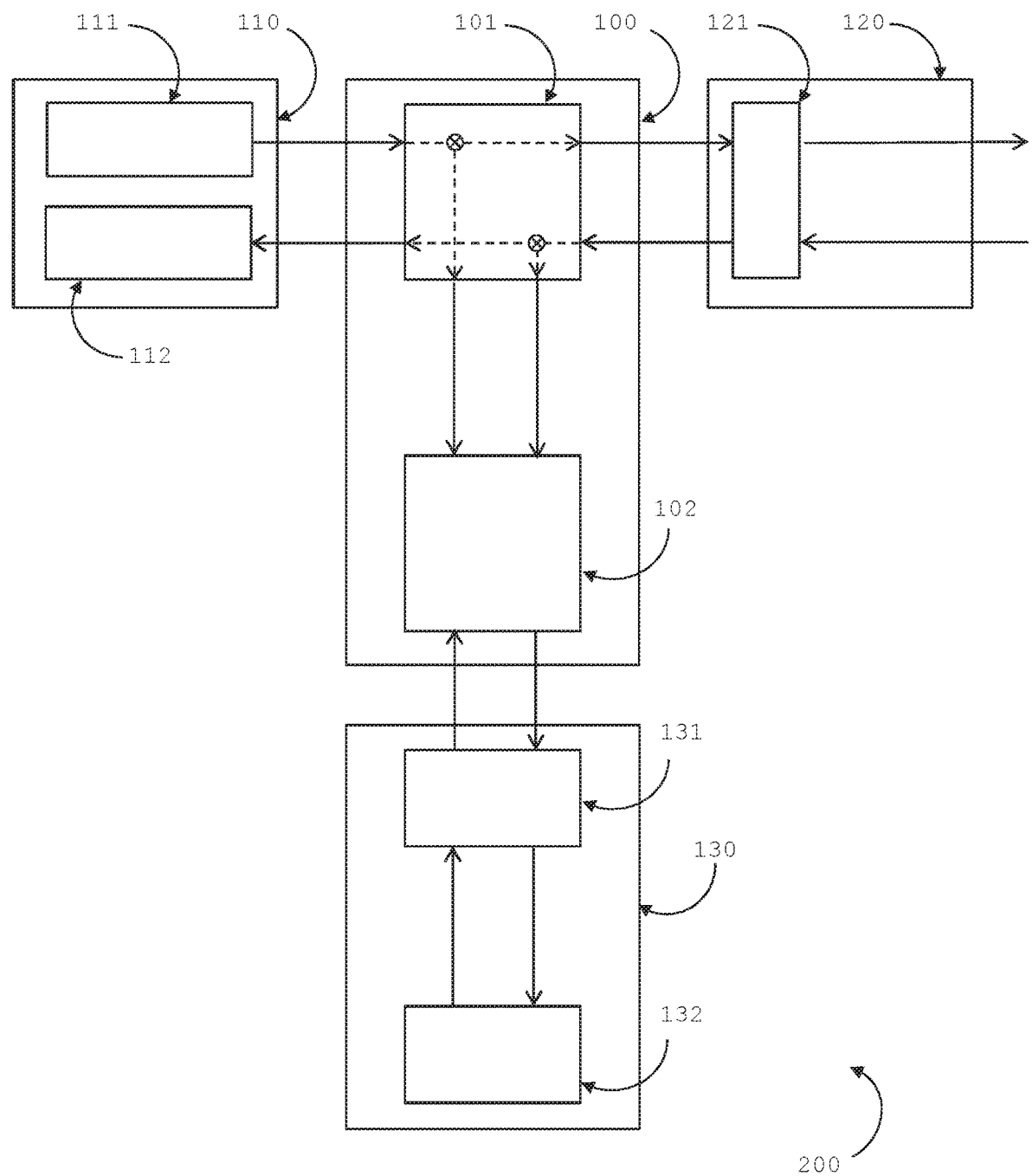
FIG. 1 illustrates an audio interface device and its connectivity according to an embodiment of the present solution.

FIG. 1 illustrates an example of an audio interface device 100 and its connectivity according to an embodiment of the present solution. In the example of FIG. 1, an audio interface device 100, as part of an audio interface system 200, comprises an interface unit 101 and a wireless unit 102. The audio interface device 100 shown in FIG. 1 may be connected to a headset 110, a communication device 120 and a remote audio device 130. The headset 110 shown in FIG. 1 comprises a microphone 111 and a speaker 112, and may otherwise be provided in a way to facilitate making a hand-free phone call. Further, the communication device 120 shown in FIG. 1 may be a desktop computer or a workstation and comprises a communication unit 121. Further, the remote audio device 130 in FIG. 1 comprises a networking unit 131 and a processing unit 132.

As shown in FIG. 1, the audio interface device 100 may be part of an audio interface system 200 and may be connected to a headset 110 and a communication device 120. The connection to the communication system 120 is preferably provided by a communication unit 121 of the communication device 120, such as a USB interface, but other wired or wireless serial or parallel interfaces may also be used. In such a case, the audio interface device 100 may be embodied in the form of a USB dongle or the like. However, different communication standards, using a peripheral component interface (PCI) or similar may alternatively be used, too. In such a case, the dongle may also be referred to as an "extension card". In the case of using a wired connection, the communication unit 121 of the communication device 120 may also power the audio interface device 100, whereas an power source may be supplied in the audio interface device 100 in case the communication unit 121 of the communication device 120 implements a wireless communication to the interface unit 101. Such a power source may be a battery used to power the audio interface device 100. Such a battery-based configuration may, for example, be necessary when the audio interface device 100 is embodied as a wearable device, such as a neckless, wristband, a smart watch, an integrated headset or similar. Nonetheless, the task characterizing the communication device 120 is to provide a telephone, video-call or similar multimedia-call function. This task may be realized over VoIP by a personal or workstation computer as part of a call-center or any other telephone configuration.

Further, in this embodiment, the interface unit 101 of the audio interface device 100 receives an audio signal (first audio signal) from a microphone 111 which is preferably provided in the headset 110. This first audio signal may be a speech signal of a call from an agent engaged in the call. The interface unit 101 of the audio interface device 100 then relays the first audio signal between the microphone 111 and the communication device 120 so as to facilitate a telephone call function. Additionally, the interface unit 101 of the audio interface device 100 receives another audio signal (second audio signal) from the communication device 120 which may be a corresponding speech signal from another call participant of the call. The interface unit 101 of the audio interface device 100 also relays the second audio signal between the communication device 120 and a speaker 112 which is preferably provided as part of the headset 110, to facilitate the telephone call function. However, both microphone 111 and speaker 112 need not be implemented as a headset 110 in case they are realized as separate entities like a desk or clip-on microphone and microphone-less headphones, for example. To relay the first/second audio signal may also comprise converting an analog signal into a digital signal, converting the audio signal into a different communication standard (between AUX and Bluetooth or AUX and USB), or the like. Further, the first/second audio signal may be related to an audio VoIP signal, a continuous real-time signal, or the like.

Based on the above, the interface unit 101 of the audio interface device 100 relays the first audio signal between the microphone 111 and the communication device 120 and the second audio signal between the communication device 120 and the speaker 112. In another embodiment, this interface unit 101 may be configured to at least partially convert the audio signals from an analogue form into a digital form or vice versa. Such a configuration is beneficial when the communication unit 121 in the communication device 120 does not provide such conversion.

Additionally, when relaying the first and second audio signal, the interface unit 101 may provide functions to convert an analogue signal into its digital representation (ADC) and/or provide an interface between different communication standards, such as Bluetooth or AUX and USB, for example. In other words, the interface unit 101 may be a soundcard, microprocessor, microchip or central processing unit (CPU) of the audio interface device 100.

Additionally, the interface unit 101 is configured to route first and second audio data to a wireless unit 102 of the audio interface device 100. Herein, the first audio data and second audio data are related to the first audio signal and the second audio signal and may correspond to the original first and second audio signal or be related to any processing of the original audio signals. For example, the first and second audio data may be an audio representation of sound using a specific format or codec for representing one or more audio waveforms to represent "snippets" of the corresponding audio signal or voice samples. Also, in another embodiment, the interface unit 101 of the audio interface device 100 may be further configured to generate the first and second audio data by converting the first and second audio signal into a different form, e.g. by implementing sampling, ADC functions, or the like. The audio data may thus correspond to the original first and second audio signals or are related to any processing of the audio signal, e.g. audio representations (audio representation of sound is a general and uniform representation of system sound and system mic sound, i.e. a uniform data format representing waveform "snippets" of the corresponding voice samples, music samples, video samples, error messages, etc. For example, an audio representation may be a specific file format representing an audio waveform.

When routing the first audio data and second audio data, the interface unit 101 is preferably configured to perform said routing at all times when the corresponding first audio signal and second audio signal of the call are provided to not lose or accidentally discard any data.

In this regard, the wireless unit 102 is preferably configured to implement a wireless standard that enables communication to said remote audio device 130. That is, communication to the remote audio device 130 is preferably realized by use of a network unit 131 provided as part of the remote audio device 130. A connection to this network unit 131 is preferably realized via direct wireless communication using WiFi or Bluetooth standards, but may also be facilitated using an intermediate computer, a mobile or cloud-based communication network (not illustrated in FIG. 1). In either case, communication of the first audio data and second audio data from the audio interface device 100 to the remote audio device 130 is preferably realized without using the headset 110 or the communication device 120, e.g. to transmit data. In other words, only the wireless unit 102 of the audio interface device 100 transmits the first audio data and second audio data to the remote audio device 130.

More specifically, the remote audio device 130 is preferably a remote server that is different to the communication device 120 and may provide cloud-like services by use of its processing unit 132. In the case where the processing unit 131 is a soundcard, CPU or digital signal processing (DSP) unit, such services may include audio processing and in the case where the processing unit 132 is a remote loudspeaker, such services may include remote audio output. Preferably, such remote playback may also be performed only for sections or subsections of the first and/or second audio data. In the former case, a preferable function of the processing unit 131 is to perform processing of the first and/or second audio data.

In a further embodiment, the processing unit 132 may perform processing of the first audio data and/or second audio data to generate a (feedback) instruction (first instruction) in case it is determined, for example by the remote audio device 130, that the first and/or second audio data need to be received or need no longer be received. The latter may be the case, when an audio playback (remote playback) by the remote audio device 130 is no longer needed and/or when it is recognized that at least one of the call participants does not want the call to be analyzed and/or transcribed and/or otherwise processed. The first instruction is then preferably sent by the networking unit 131 to the wireless unit 102 of the audio interface device 100 to control the routing of the first audio data and/or second audio data. In other words, this first instruction is preferably used to start or stop routing altogether, and alternatively, to start or stop routing of the first or second audio data in case only the call participant's (related to first audio signal) or the agent's speech (related to second audio signal) is to be processed. Further, the first instruction may also be used to cause the interface unit 101 of the audio interface device 100 to selectively route, based on the above volume thresholds, for example, parts of the first and/or second audio data to reduce the amount of data transmitted, but without omitting data that is required for the audio and/or speech analysis and/or processing. When the (feedback) instruction (first instruction) is received, the interface unit 101 selectively starts or stops the routing of at least parts of the first and/or second audio data.

Alternatively or in addition to the first instruction described above, another instruction may be sent from the networking unit 131 to the wireless unit 102 of the audio interface device 100. This another instruction may include registration information which contains a unique ID. The registration information would be collected on the server 130 via inputs made by a user. The registration information (login details associated with the audio interface device ID, e.g. dongle ID number (#)) may then be sent via the another instruction to the interface unit 101 of the audio interface device (e.g. dongle) 130 to verify the registration credentials and tag and annotate a user to the dongle ID number (#). Such information may also be required to be sent to the interface unit 101 (e.g. microcontroller) in case of resetting or reconfiguring the unique dongle ID #. An alternative method of tagging a user to the specific audio interface device 100 (e.g. dongle) may be via inputs received to the interface unit 101 (e.g. microcontroller) directly from the communication device 120. This may require, however, a USB interface between the interface unit 101 (e.g. microcontroller) and the communication device 120, so that a microcontroller could receive USB signals from the communication device 120.

As a further embodiment, the interface unit 101 of the audio interface device 100 may also analyze the first and/or second audio data by performing audio and/or speech analysis to determine whether routing is necessary. Analyzing the one or more waveforms, for example, as to whether it exceeds a certain volume threshold may indicate whether the audio signal is loud enough to qualify as active speech (which should be routed) or silent enough to qualify as a speech break (which should not be routed). The interface unit 101 of the audio interface device 100 may further comprise an analysis capability and may also use another threshold to distinguish between speech that is part of the call and speech that is background noise. As a result, only the audio data exceeding at least one of the before-mentioned volume (i.e. active speech, speech break, background noise) thresholds is routed. This embodiment results in a reduction of the amount of first audio data and/or second audio data that are routed to the wireless unit 102 and transmitted over the connected wireless network, hence reducing the workload of the wireless unit 102 and the connected wireless network despite transmitting all necessary data for further speech and/or audio processing to a remote audio device 130.

The interface unit 101 may therefore be configured to analyze the first and/or second audio data to determine a call candidate model. In other words, if a representation (e.g. a waveform, a snippet, etc.) of the first and/or second audio data indicates that a certain volume threshold, as may be indicated by the first instruction, is exceeded, then the interface unit 101 may determine that the corresponding audio data are to be routed to the wireless unit 102 to be transmitted to the remote audio device (e.g. server) 130. On the other hand, if the representation of the first and/or second audio data indicates that the certain volume threshold is not exceeded, then the corresponding audio data may be determined to be unrelated or unimportant to a proper speech analysis and may thus be considered as filtered-out noise components that are not routed to the wireless unit 102.

The first instruction may thus also be related to specific waveform parameters to be used for the above analysis. As such, the analysis of the first and/or second audio data may be dynamically adapted.

In this connection, the interface unit 101 may thus be configured to process the first/second audio data, in particular to filter, compress, delete, discard, and/or to decide whether the audio data is to be transmitted to a remote computer for further audio/speech-analysis and/or audio/speech processing and/or remote playback.

In a further embodiment, the processing unit 132 may perform processing of the first audio data and/or second audio data to generate another (feedback) instruction (second instruction) when it is determined, e.g. by the remote audio device 130, that a quality of the audio data is below a predetermined quality threshold (quality threshold), for example based on a speech-to-noise ratio, a bit rate, a signal to noise ratio, or clarity of speech in audio data, sent from the audio interface device 100 is of sufficient level, or the like. This quality threshold may be used to determine whether the quality of the audio data generated by the audio interface device 100 is of a certain level for a full speech analysis at the remote audio device 130. This second instruction is preferably sent by the networking unit 131 to the wireless unit 102 of the audio interface device 100 to control the function of the interface unit 101 of the audio interface device 100 with regard to the conversion of the first/second audio signals to the first/second audio data. For example, this control may involve optimizing the conversion, processing and/or analysis parameters that may be used by the interface unit 101 of the audio processing device 100. Thereby, the audio data conversion and/or analysis by the interface unit 101 of the audio processing device 100 can be dynamically and continuously optimized even when the interface unit 101 has limited speech analysis capabilities. As above, the second (feedback) instruction may selectively be provided with regard to the first or second audio data. As a result, the routing of the audio interface device 100 is optimized based on the audio and/or speech processing. As a result, analysis performed by the audio interface device 100 can more selectively route the first and/or second audio data and therefore reduce a load on the wireless unit 102, network and networking unit 131, without omitting audio data required for the processing performed by the remote audio device 130. Thereby, dynamic and real-time optimization of sampling and/or filter parameters of the interface unit 101 of the audio interface device 100 becomes possible, which is beneficial when the characteristics of the first and second audio signal change.

It should be noted that in the above further embodiments, the first and second instructions may be generated and transmitted independent from each other and need not be used in any specific order. Further, in a final implementation, the first and second instructions may also be sent at the same time in one instruction command. In summary, the first instruction is preferably generated by the processing unit 132 when determining whether first and/or second audio data are required for speech-analysis based feedback, speech-analysis based call transcription or storage of the first and/or second audio data. The second instruction is preferably generated by the processing unit 132 to dynamically adjust the quality threshold used to maintain the quality of the audio analysis (voice vs noise detection) that is performed in the interface unit 101 of the audio interface device 100. This determining may be implemented by the processing unit 132 as a quality determining unit. The second instruction may also preferably be generated by the processing unit 132 to dynamically control the quality threshold which impacts the quality of the audio data generation (bit rate, signal-to-noise ratio (SNR), amount of noise filtered out, clarity of speech in audio data etc.) routed by the interface unit 101 of the audio interface device 100.

As a result, complex and/or error prone reconfiguration of the VoIP system is avoided in order to acquire the first and second audio data. Furthermore, hardware required for audio and/or speech analysis need not be provided in the communication device 120 since the remote audio device 130 as a remote audio analysis server provides the required hardware, e.g. the processing unit 132. Using dedicated (remote) hardware to perform audio and/or speech analysis frees computer resources on the communication device 120 and enables control and optimization of the communication between audio interface device 100 from the remote audio server 130. The latter point is particularly relevant in a scenario where multiple audio interface devices 100 are engaged in call activities and communicate with the remote audio device 130, e.g. in a call-center.

Figure 2:
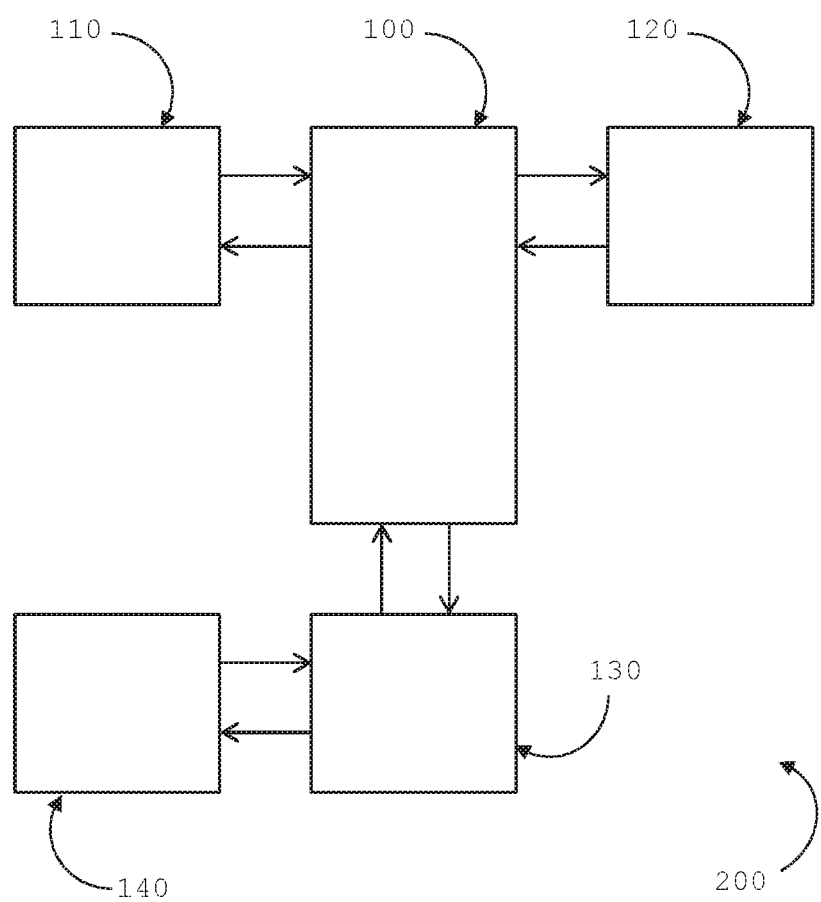
FIG. 2 illustrates an audio interface system according to another embodiment of the present solution.

FIG. 2 illustrates an audio interface system according to another embodiment of the present solution. As shown in FIG. 2, the audio interface system 200 may also comprise an audio interface device 100, a microphone 111 and speaker 112 in preferably a headset 110, a communication device 120, and a remote audio device 130. As already mentioned, as a further embodiment, the remote audio device 130 may be a remote audio output device, such as a remote loudspeaker and/or is configured to speech-analyze the first audio data and second audio data to generate the first, second and/or third instruction. Therefore, a repeated description of these components is omitted.

Additionally, however, the audio interface system may comprise an agent interface device 140, wherein the remote audio device 130 transmits feedback data to the agent interface device 140. For example, in a case where the remote audio device 130 does not provide audio output, the agent interface device 140 may receive feedback data that is the first and second audio data, so as to realize the function of a remote loudspeaker for providing audio feedback data.

Preferably, the agent interface device 140 is a laptop, tablet, smart phone, smart watch or another device comprising a graphical display that is provided to the user or agent engaged in the call. Thereby, the agent interface device 140 is preferably configured to display visual feedback data based on the processing, e.g. speech-analysis processing, of the first and/or second audio data to the user or agent. When performing processing of the first and/or second audio data, this visual feedback may cause the user or agent to adjust his or her calling behavior, including talking speed and pitch in order to improve the engagement in the call. This visual feedback may also provide additional data related to the conversation of the call, e.g. key terms or topics that were being discussed. For instance, when performing processing in the form of transcription of both the first and second audio data, the visual feedback data may cause the user or agent to be reminded of previous conversation topics that were subject of the call in order to assure that all enquired conversation topics have been addressed when the call is ended. This is particularly useful if the number of topics addressed during the call increases, e.g. when a plurality of questions needs to be answered by the agent.

Figure 3:
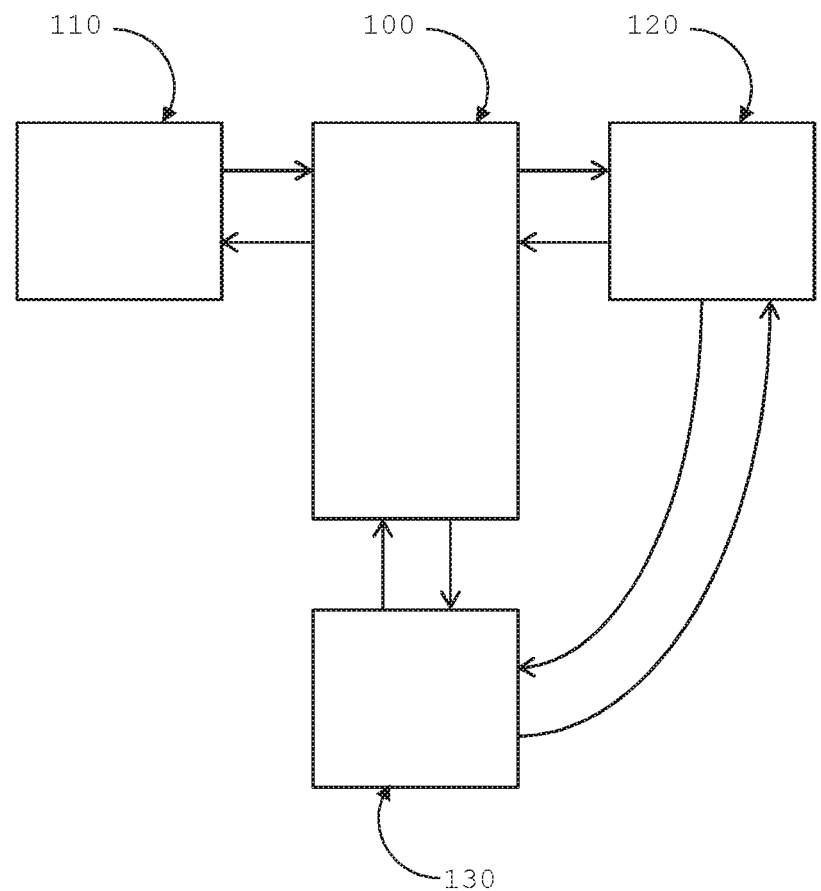
FIG. 3 illustrates the audio interface system according to another embodiment of the present solution.

FIG. 3 illustrates the audio interface system according to another embodiment of the present solution. In the above embodiments, the agent interface device 140 is not the communication device 120, which is favorable in cases where the required feedback software cannot be installed on the communication device 120. In this regard, when it is possible to provide the required software on the communication device 120, in the further embodiment shown in FIG. 3, the agent interface device 140 is the communication device 120.

Regardless of the implementation of the agent interface device 140, the remote audio device 130 is configured to generate a first instruction when it is determined to stop or start routing by the audio interface device and/or a second instruction when it is determined that a quality of the audio data is below a predetermined quality threshold.

Figure 4:
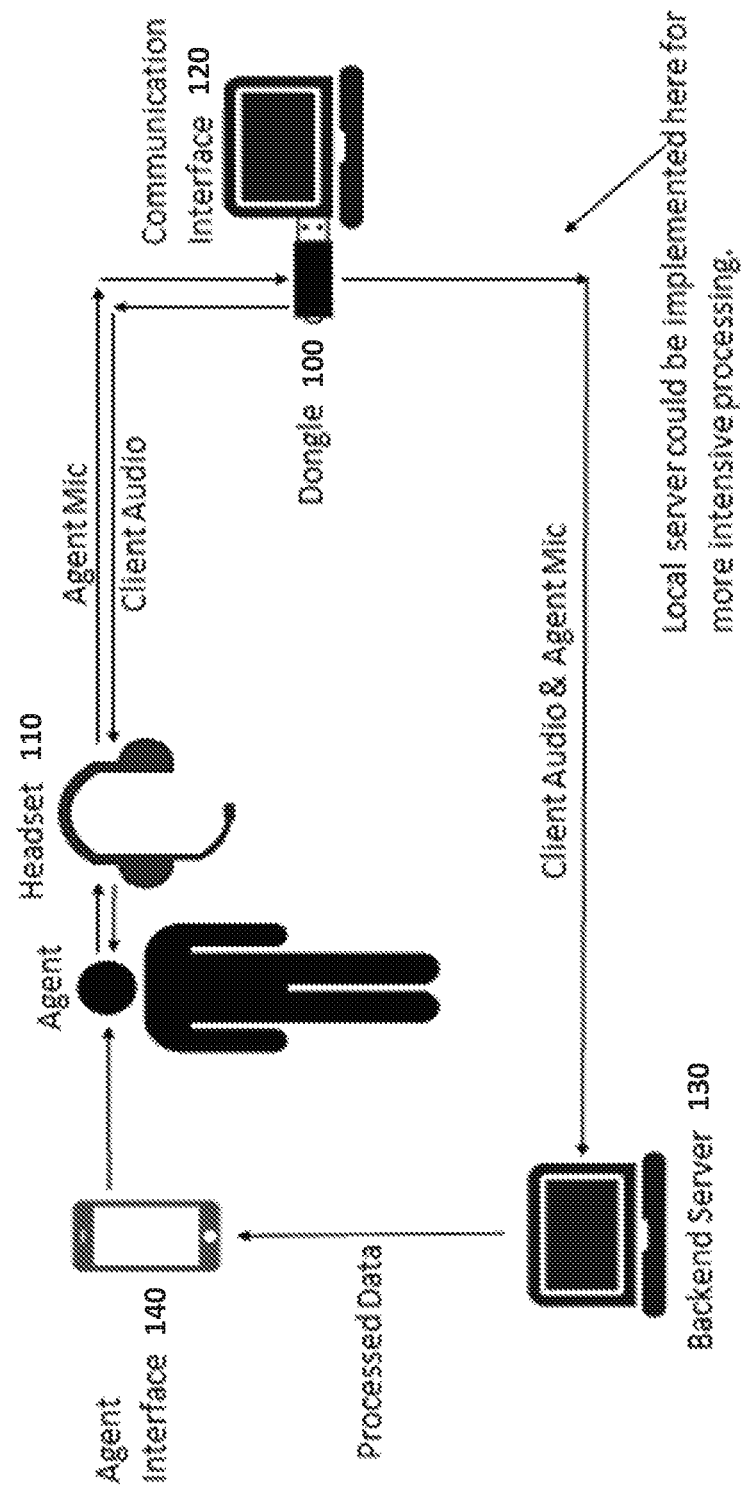
FIG. 4 illustrates the functional interplay amongst components of the audio interface system according to another embodiment of the present solution.

FIG. 4 illustrates the functional interplay amongst components of the audio interface system according to another embodiment of the present solution. More specifically, FIG. 4 shows the functional interplay of all components already shown in FIG. 1, FIG. 2 and FIG. 3, but provides further aspects for better illustration and understanding. Herein, the agent (or user) is also illustrated and receives feedback from the agent interface (device) 140 and interacts with a headset 110. The headset 110 is configured to send the first audio signal, i.e. "the agent mic signal" (hereon, these two terms are used interchangeably) to the audio interface device 100, e.g. a dongle which is plugged into the communication interface 120 via USB (hereon the term "dongle" is used interchangeably for "audio interfaced device"). This agent mic signal is relayed by the dongle 100 to the communication interface 120 which forwards the agent mic signal to the VoIP telephone system. The second audio signal, i.e. "client audio signal" (hereon, these two terms are used interchangeably) is received at the communication interface 120, from the VoIP system, and sent to the dongle 100, which in turn relays the client audio signal to the agent. Thereby, the dongle 100, headset 110 and communication interface 120 present all system component necessary to realize VoIP calls.

The dongle 100 also transmits the first and/or second audio data, i.e. the client audio and/or agent mic data (hereon, the two terms are used interchangeably) to the remote audio device 130, i.e. a "backend server" (hereon, the two terms are used interchangeably). Following the analysis of the client audio and/or agent mic data on the backend server, feedback data, i.e. processed data in FIG. 4, are sent to the agent interface (device) 140. The agent receives feedback from the agent interface (device) 140 regarding his/her voice, articulation and/or subject of the call, and can therefore optimize his/her behavior during the call. For example, if the agent takes a long time to answer one out of two specific questions, a transcription displayed on the agent interface (device) 140 prevents the second question from being overlooked or forgotten. Also, in case the backend server 130 is a remote loudspeaker, training of an agent not presently engaged in a call may be realized since he/she can listen to and learn from a call.

Figure 5:
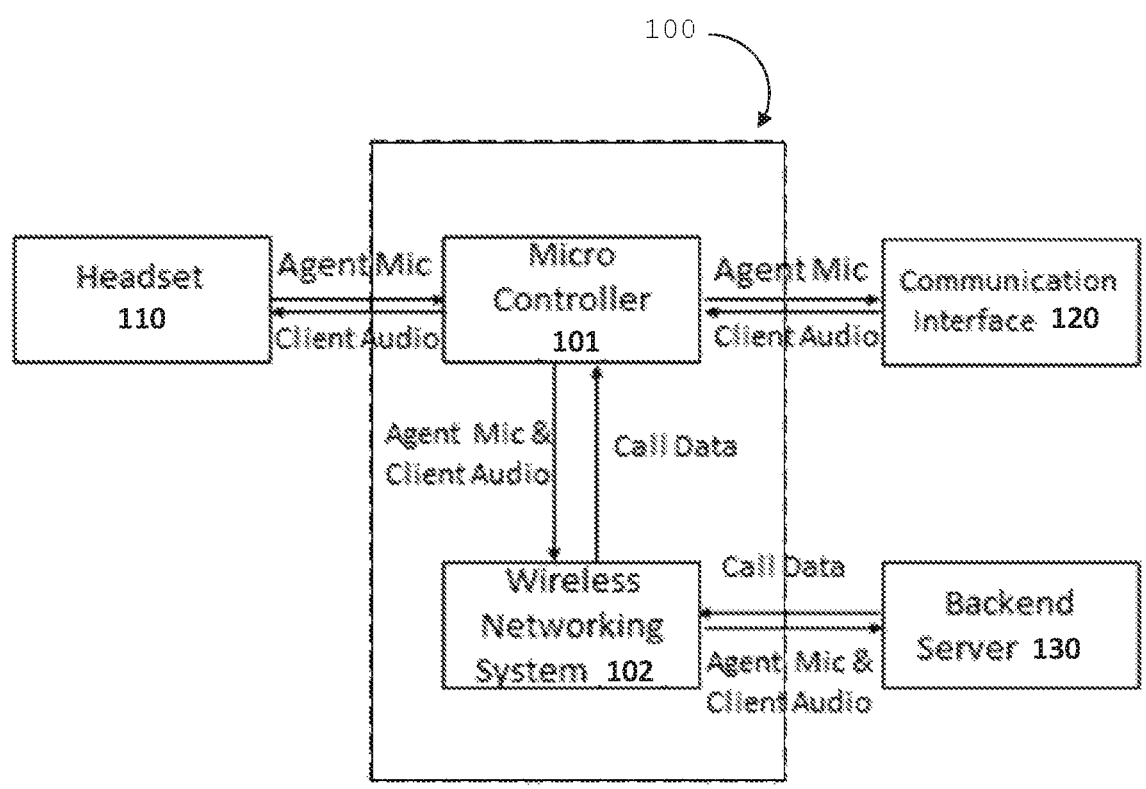
FIG. 5 illustrates the functional interplay amongst components interfaced by the audio interface device according to another embodiment of the present solution.

Based on the system illustrated in FIG. 4, FIG. 5 shows the functional interplay amongst components interfaced by the dongle (audio interface device) 100 in a similar manner as that of FIG. 1. A description of components with identical terminology/reference signs compared to FIG. 4 is therefore omitted. Herein, call-related data is provided form the backend server 130 to the dongle 100. Here, the call-related data is equivalent of receiving the first and/or second instruction at the wireless unit 102, i.e. "wireless networking system" (hereon, the two terms are used interchangeably). More specifically, the wireless networking system 102 uses the call-related data to dynamically and in real-time adjust the operation of the interface unit 101, i.e. "microcontroller" (hereon, the two terms are used interchangeably). The level of adjustment of the micro controller 101 may comprise e.g. settings for analogue to digital conversion (ADC), sampling rate of the ADC and/or a lightweight audio analysis (e.g. with regard to one or more volume thresholds compared to waveforms of the audio signal/data) to control routing.

FIG. 5 illustrates the functional interplay amongst components interfaced by the audio interface device according to an embodiment of the present solution. More specifically, FIG. 5 depicts an illustration regarding the interplay between audio interface device (e.g. dongle) 100, headset 110, communication interface 120 and backend server 130. In this embodiment, the communication unit 121 of the communication device 120 is realized as a "USB soundcard" (hereon, the two terms are used interchangeably). The remote audio device or backend server 130 is referred to as "I2xServer" (hereon, the two terms are used interchangeably) and may provide the aforementioned first and/or second instruction to adjust settings of the interface unit 101 comprising an audio sampler 101a and microcontroller 101b, and the wireless unit 102, i.e. WiFi module (hereon, the two terms are used interchangeably).

In the following, for better understanding of a specific embodiment of the present solution, a case where the agent uses the dongle 100 in the environment of a call-center is explained. As illustrated in FIG. 4, for example, an agent with a headset 110 wishes to make a call, and have that call analyzed and/or processed and presented to them without needing to send the data via the communication interface 120 that is being used to facilitate the call. To achieve this end, the agent communicates with the other person via the headset 110, which is connected to the dongle 100. The headset 110 sends the agents audio recorded by the microphone to the dongle via a cord or wireless connection, and the dongle 100 sends the client audio from the communication interface 120 back to the speaker of the headset 110 via a cord or wireless connection. The agent uses the communication interface 120 to place the call, which could be either VoIP, or in some cases a phone line or cellular data. Effectively the headset 110 is connected to the dongle 100, and the dongle 100 is plugged into the communication interface 120. The communication interface 120 could be a computer, with a dongle 100 plugged into the USB port, and a headset 110 plugged into the dongle 100 or connected to the dongle 100 via Bluetooth.

The dongle 100 captures the headphone 110 mic (audio signal) and the communication interface 120 audio signal, and transmits related audio data to a backend server 130 via a WiFi module 102. The backend server 130 can then analyze the data or serve as a router for the audio data to be streamed from the dongle 100 to the agent interface 140. The analyzed data being sent to the agent interface 140 can include: an automatic speech recognition transcription, machine learning insights on the data, best practice insights, real-time script compliance, real-time suggestions on how to improve the objective of the call, etc. The agent interface 140 can then display the relevant call data, or in the case of the speaker, can play the audio call on a remote system in real-time. To ensure that the analyzed call data is sent to the correct agent, the dongle 100 and agent both have unique identification numbers which are associated with each other.

After plugging the dongle 100 into the agent's communication device 130, the agent maybe prompted to "login" to e.g. an i2x application and give some form of personal credentials. The agents' personal credentials and IP address are noted with reference to the identification number of the dongle 100. All data that are being sent from the dongle 100 to the server 130 are labelled with the dongle's unique identification number. The server 130 is able to access a database of dongle identification numbers and their associated agents. Then the processed call data is able to be sent to the correct agent and agent interface 140. In the case where the agent interface device 140 is a separate device from the communications device 120, an agent also needs to login to the agent interface 140 in order to receive the correct call data.

In reference to FIG. 5, as an embodiment of the present solution, the dongle 100 may have three external "hard" connections, and one wireless connection. "Hard" here refers to a hardware interface instead of a wireless interface. Two of the external hard connections; a 3.5 mm mic and a 3.5 mm stereo, connect the dongle 100 to the headset 110. The other connects via USB to the communication interface 120. The wireless unit 102 bridges the dongle 100 with the internet (or any other computer network) as a wireless networking system 102. The audio data related to the agent microphone and client audio signal is sent to the backend server 130 for further processing, and then eventually, as feedback, to an agent interface 140.

Figure 6:
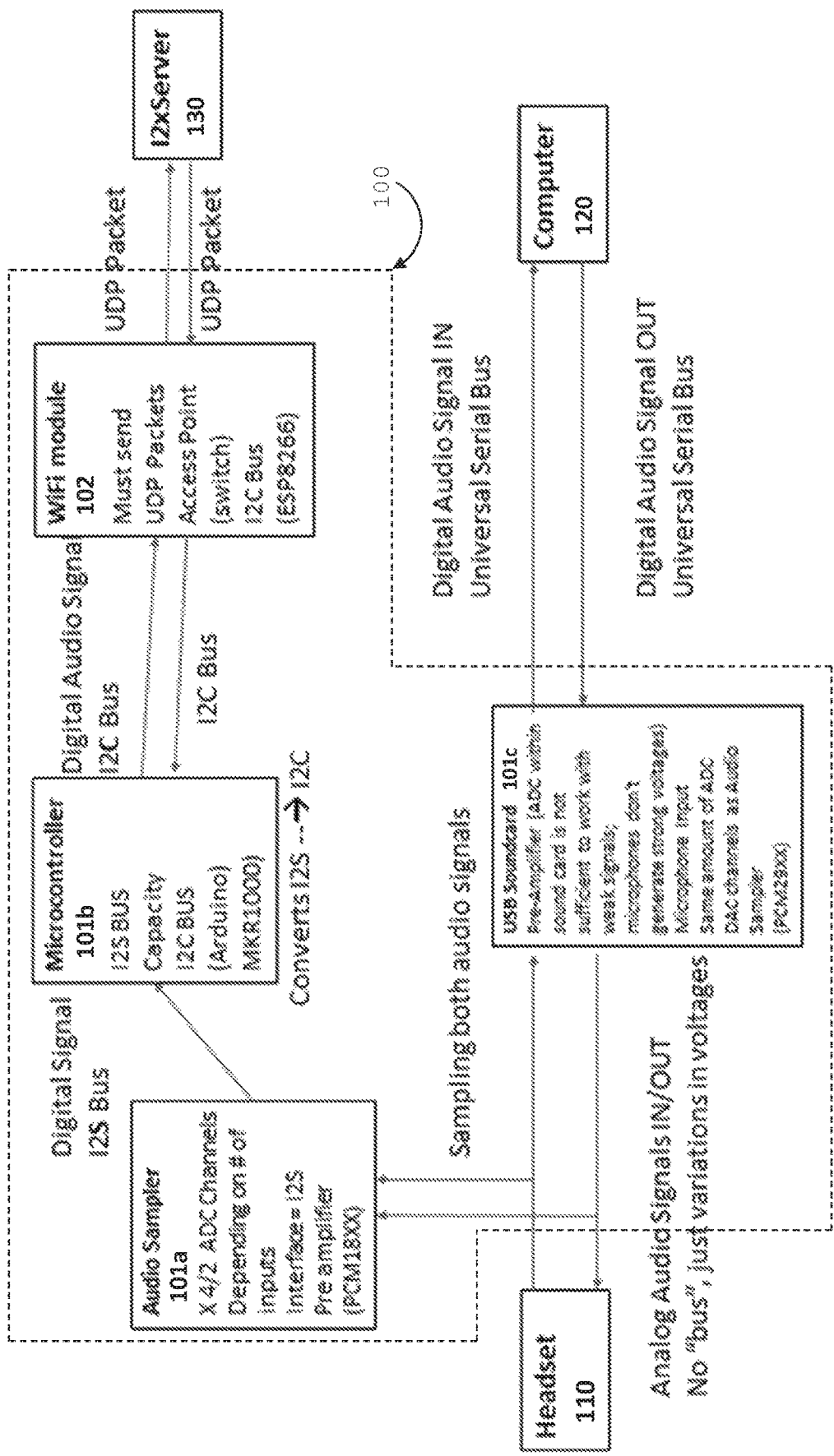
FIG. 6 illustrates the technical interplay amongst components of the audio interface system according to another embodiment of the present solution.

In reference to FIG. 6, as an embodiment of the present solution, the dongle 100 may require four hardware components to fulfill the function of sending audio call data from a headset 110, and communication interface 120, to a remote server 130. A USB soundcard 101c that is either provided in the dongle 100 or the communication unit 121 of the communication device 120 (the former option is depicted in FIG. 6), an audio sampler 101a, a microcontroller 101b and a WiFi-module 102.

The prototype soundcard that is provided in the dongle 100 maybe a "PCM29XX" series chip, but for production the soundcard could omitted or be anything with the following requirements; a pre-amplifier for amplifying the signal from the microphone, a microphone input and the same amount of ADC and DAC channels (digital to analog and analog to digital converters) as will be on the audio sampler 101a. This number will be dependent on how many inputs are on the dongle 100, but in most cases will be 4 ADC channels to cope with the current load of microphone and communication interface inputs. The soundcard is responsible for converting the analog signals received from the microphone to digital format so that it can be transmitted through to the communication device 120 and an audio output is received from the microphone to the client on the other side of the call. The digital signal from the communication device 120 is converted into an analog signal, and sent to the headset 110 for the dongle agent to hear the communication device audio stream, i.e. the voice of the client on the other side of the call. The analog signal from the microphone is also sent to the audio sampler 101a, along with the analog signal that was converted from the digital signal with the soundcard 101c.

The audio sampler 101a used in the prototyping maybe a "PCM 18XX" series chip, but for production it could be any audio sampler with the following requirements: 4 or 2 ADC channels (4 in most cases), an I2S interface and a pre-amplifier. The audio sampler takes the analog audio inputs from the soundcard and microphone, effectively both sides of a call conversation, and converts the signals into a digital I2S BUS signal. The pre-amplifier performs the same function on the audio sampler as the soundcard; amplifying the microphone analog signal voltage. The call data I2S BUS signal is sent to the microcontroller 101b where it is converted into an I2C BUS signal.

The microcontroller 101b used in the prototyping phase of development maybe an "Arduino MKR1000", but in production it may be a microcontroller 101b with the following capacities: an I2S and I2C BUS. Optionally the microcontroller can also contain a noise reduction facility for sending better quality data packets to the backend server 130. The microcontroller 101b can also be replaced with a more power consumption intensive computer chip such as an ARM processor like that used by a raspberry Pi, which would enable more functions on the dongle such as call detection and audio analysis software. The main function of the microcontroller 101b is converting the I2S signal into I2C. The microcontroller 101b is also configured to receive a signal from the WiFi-module 102, which could be some instructions from the backend server 130, e.g. for switching the dongle off or on remotely. If the agent has indicated on their agent interface 140 that they are no longer making calls, the server can switch the dongle 100 off without the user needing to interact with it from their communication device 120. The I2C audio data is sent through to the WiFi module 102 which may require, for example, UDP functionality for converting the audio data into UDP packets (alternatively TCP packets may be used, for example), an access point or switch for connecting to a WiFi network with a password, and an I2C Bus capacity. The WiFi module 102 used for prototyping is an ESP8266, but in production could be any module with the above specifications. The WiFi module can also be replaced with a cellular capable module with connectivity to a cellular network.

The WiFi module 102 sends and receives UDP packets to and from the backend server 130. UDP packets may be chosen over TCP because of the faster speed of data transmission. The downside of using UDP is that some data may be lost in transmission, but this is not a significant obstacle for the purpose of audio data transmission.

The audio interface devices and audio interface system herein are not limited to these scenarios as described in detail above. As described above, embodiments and examples of the present solution avoid conventional system requirements like specific hardware or operating system. Having an improved device and/or system of handling call data has the advantage of requiring fewer dependencies, being a backup and/or alternative solution for handling a duplicate copy of call data or audio data to a server that might be required to, for security or legal reasons, not be sent through typical VoIP service providers It will be appreciated that various modifications and variations can be made in the described devices and systems as well as in the construction of embodiments of present solution without departing from the scope or spirit of the invention.

The present solution has been described in relation to particular embodiments and examples which are intended in all aspects to be illustrative rather than restrictive.

Moreover, other implementations of the present solution will be apparent to the skilled person from consideration of the specification and practice of the invention disclosed herein. It is intended that the specification and the examples be considered as exemplary only. To this end, it is to be understood that inventive aspects lie in less than all features of the foregoing disclosed implementation or configuration.

Thus, the true scope and spirit of the present solution is indicated by the following claims.

LIST OF REFERENCE SYMBOLS 100 audio interface device
101 interface unit
102 wireless unit
110 headset
111 microphone
112 speaker
120 communication device
121 communication unit
130 remote audio device
131 networking unit
132 processing unit
140 agent interface device
200 audio interface system

What is claimed is:

1. An audio interface device comprising:
    an interface unit;
    a wireless unit;
    an agent interface device;
    wherein the interface unit is configured to
        relay a first audio signal transmitted between a microphone and a communication device and a second audio signal transmitted between the communication device and a speaker, and
        route first audio data related to the first audio signal and/or second audio data related to the second audio signal to the wireless unit;
    wherein the wireless unit is configured to
        transmit the first audio data and/or the second audio data to a remote audio device; and
    wherein the remote audio device transmits feedback data to the agent interface device.

2. The audio interface device of claim 1, wherein the interface unit is further configured to generate the first and/or second audio data by converting the first and second audio signal.

3. The audio interface device of claim 1, wherein the interface unit is further configured to analyze the first and/or second audio data.

4. The audio interface device of claim 1, wherein the interface unit is further configured to process the first and/or second audio data.

5. The audio interface device of claim 1, wherein the wireless unit is further configured to receive a first instruction from the remote audio device to control the routing of the first and/or second audio data.

6. The audio interface device of claim 5,
    wherein the interface unit is further configured to analyze the first and/or second audio data;
    wherein the wireless unit is further configured to receive a second instruction from the remote audio device to control the analysis of the first and/or second audio data.

7. The audio interface device of claim 6,
    wherein the interface unit is further configured to generate the first and/or second audio data by converting the first and second audio signal;
    wherein the wireless unit is further configured to receive a third instruction from the remote audio device to control the generating of the first and/or second audio data.

8. The audio interface device of claim 1, wherein the audio interface device is a dongle.

9. The audio interface device of claim 1, wherein the audio interface device is a wearable device.

10. The audio interface device of claim 1, wherein the audio interface device is integrated into a headset.

11. The audio interface device of claim 1, wherein the interface unit comprises a microcontroller or microprocessor.

12. An audio interface system, comprising:
    an audio interface device;
    a communication device;
    a remote audio device; and
    an agent interface device;
    wherein the audio interface device comprises:
        an interface unit;
        a wireless unit;
        wherein the interface unit is configured to
            relay a first audio signal transmitted between a microphone and a communication device and a second audio signal transmitted between the communication device and a speaker, and
            route first audio data related to the first audio signal and/or second audio data related to the second audio signal to the wireless unit;
        wherein the wireless unit is configured to
            transmit the first audio data and/or the second audio data to a remote audio device; and
        wherein the remote audio device transmits feedback data to the agent interface device.

13. The audio interface system of claim 12, wherein the remote audio device is a remote audio output device.

14. The audio interface system of claim 12, wherein the remote audio device is configured to speech-analyze the first audio data and second audio data.

15. The audio interface system of claim 12, wherein the agent interface device is the communication device.

16. The audio interface system of claim 12, wherein the remote audio device is configured to generate a first instruction when it is determined to stop or start routing by the audio interface device.

17. The audio interface system of claim 16, wherein the remote audio device is configured to generate a second instruction when it is determined that a quality of the audio analysis is below a predetermined first quality threshold.

* * * * *